United States Patent
Husain et al.

(12) 
(10) Patent No.: US 11,165,298 B2
(45) Date of Patent: Nov. 2, 2021

(54) ELECTRIC MACHINE WITH SOLID AND STRANDED CONDUCTORS

(71) Applicant: BorgWarner Inc., Auburn Hills, MI (US)

(72) Inventors: Tausif Husain, Carmel, IN (US); Josh Lahrman, Fishers, IN (US)

(73) Assignee: BorgWarner Inc., Auburn Hills, MI (US)

( * ) Notice: Subject to any disclaimer, the term of this patent is extended or adjusted under 35 U.S.C. 154(b) by 67 days.

(21) Appl. No.: 16/299,859

(22) Filed: Mar. 12, 2019

(65) Prior Publication Data
US 2020/0295611 A1 Sep. 17, 2020

(51) Int. Cl.
*H02K 3/12* (2006.01)
*H02K 3/28* (2006.01)
*H02K 3/48* (2006.01)
*H02K 1/16* (2006.01)

(52) U.S. Cl.
CPC ............ *H02K 3/12* (2013.01); *H02K 3/28* (2013.01); *H02K 3/48* (2013.01); *H02K 1/16* (2013.01)

(58) Field of Classification Search
CPC .. H02K 3/12; H02K 3/14; H02K 3/28; H02K 3/48; H02K 3/50; H02K 3/505; H02K 1/16
USPC ........................................ 310/198, 201, 207
See application file for complete search history.

(56) References Cited

U.S. PATENT DOCUMENTS

| 7,034,428 B2 | 4/2006 | Cai et al. |
| 7,183,678 B2 | 2/2007 | Sivasubramaniam et al. |
| 2001/0011851 A1 | 8/2001 | Asao et al. |
| 2004/0119362 A1* | 6/2004 | Neet ......................... H02K 3/12 310/208 |

(Continued)

FOREIGN PATENT DOCUMENTS

| JP | 2004153874 A | 5/2004 |
| JP | 2014023170 A | 2/2014 |

(Continued)

OTHER PUBLICATIONS

Chinen, Machine Translation of JP2017184394, Oct. 2017 (Year: 2017).*

(Continued)

*Primary Examiner* — Quyen P Leung
*Assistant Examiner* — Eric Johnson
(74) *Attorney, Agent, or Firm* — Bose McKinney and Evans LLP (57) ABSTRACT

An electric machine having a stator core with axially extending slots and a plurality of windings. Each stator winding defines a continuous electrical conductor having a first wire and a second wire connected in series. The first wire defines a plurality of first axially extending segments disposed in the slots and a plurality of first end turn segments. The second wire defines a plurality of second axially extending segments disposed in the slots and a plurality second end turn segments. The first wire is a solitary wire defining a first cross sectional area and the second wire comprises a plurality of individual strands wherein each strand defines a second cross sectional area less than the first cross sectional area. In slots containing both first and second axially extending segments, the second axially extending segments are (Continued)

disposed closer to the rotor than the first axially extending segments.

5 Claims, 8 Drawing Sheets

(56) References Cited

U.S. PATENT DOCUMENTS

| | | |
|---|---|---|
| 2005/0116573 A1 | 6/2005 | Hattori et al. |
| 2012/0326552 A1 | 12/2012 | Kinpara et al. |
| 2013/0113330 A1* | 5/2013 | Saito .................. H02K 21/14 310/207 |
| 2014/0300239 A1* | 10/2014 | Takizawa ............. H02K 3/38 310/208 |
| 2016/0036277 A1 | 2/2016 | Lynch et al. |
| 2016/0156236 A1* | 6/2016 | Metz .................... H02K 3/04 417/423.7 |
| 2016/0268861 A1* | 9/2016 | Wang ................... H02K 3/12 |
| 2019/0149001 A1 | 5/2019 | Lee |
| 2019/0260250 A1* | 8/2019 | Iki ....................... H02K 1/16 |
| 2019/0267860 A1* | 8/2019 | Inoue ................... H02K 3/14 |

FOREIGN PATENT DOCUMENTS

| | | |
|---|---|---|
| JP | 2017184394 A * | 10/2017 |
| JP | 2017184394 A | 10/2017 |
| JP | 2018117480 A | 7/2018 |

OTHER PUBLICATIONS

International Search Report and Written Opinion of the International Searching Authority, PCT/US2020/021764, dated Jul. 3, 2020, 10 pages.

* cited by examiner

ELECTRIC MACHINE WITH SOLID AND STRANDED CONDUCTORS

BACKGROUND

1. Technical Field

The present invention relates to electric machines.

2. Description of the Related Art

There is an increasing demand for compact efficient electric machines. As a general rule, an electric machine with a high winding density, often referred to as a high slot fill factor, will provide a relatively efficient machine. One way of obtaining such a high slot fill factor is use to windings wherein the individual conductors forming the windings have a relatively large cross sectional area to thereby minimize the volume of the slot that corresponds to the space between the individual conductors forming the windings.

Increasing the cross sectional area of the individual conductors facilitates a high slot fill factor but it is not without undesirable consequences. For example, when the electric machine is operating at a high speed and generating a high frequency, AC current, the conductors experience what is commonly referred to as the skin effect where only that portion of the conductor nearest the outer surface of the conductor conducts electrical current while the center portion of the conductor conducts only a relatively small amount of electrical current. This is also referred to as "AC copper loss" because such conductors are often formed out of copper and the usefulness of the central portion of the conductor is lost under such conditions. Conductors having a larger cross sectional area have a greater area that is removed from the outer surface of the conductor and, thus, experience relatively larger AC copper losses than similar conductors having a smaller cross sectional area.

An electric machine having a design which accounts for these different factors influencing the efficiency of the machine is desirable.

SUMMARY

The present invention provides an electric machine that strikes an advantageous balance between conductors having a large cross sectional area and conductors having a smaller cross sectional area.

The invention comprises, in one form thereof, an electric machine that includes a rotor operably coupled with a stator wherein the stator includes a stator core defining a plurality of axially extending slots and a plurality of windings. Each stator winding defines a continuous electrical conductor having a first wire and a second wire connected in series. The first wire circumferentially extends about the stator core for at least one wrap and the second wire circumferentially extends about the stator core for at least one wrap. The first wire defines a plurality of first axially extending segments, each of the first axially extending segments being disposed in one of the slots and a plurality of first end turn segments, each first end turn segment connecting a pair of the first axially extending segments disposed in separate slots. The second wire defines a plurality of second axially extending segments, each of the second axially extending segments being disposed in one of the slots and a plurality second end turn segments, each second end turn segment connecting a pair of the second axially extending segments disposed in separate slots. The first wire is a solitary wire defining a first cross sectional area and the second wire comprises a plurality of individual strands wherein each of the individual strands defines a second cross sectional area less than the first cross sectional area. In at least one, and in each individual slot containing both first and second axially extending segments, the second axially extending segments are disposed closer to the rotor than the first axially extending segments.

In some embodiments of the electric machine, each of the slots defines a plurality of layers, and, for each individual slot, the first axially extending segments are disposed in a first set of the layers and the second axially extending segments are disposed in a second set of the layers. In such an embodiment, each of the slots may contain both a first axially extending segment and a second axially extending segment and, for each individual slot, the first set of layers is distinct from the second set of layers. In such an embodiment, when the stator core surrounds the rotor, the second axially extending segments are disposed radially inwardly of the first axially extending segments in each individual slot.

In some embodiments of the electric machine, the plurality of slots define a circumferential slot width and the first wire defines a first circumferential width that is greater than 50% of the circumferential slot width and each of the plurality of individual strands of the second wire define a second circumferential width that is less than 50% of the circumferential slot width. In such an embodiment, the first wire may define a first radial depth and each of the plurality of individual strands of the second wire may define a second radial depth that is no greater than 50% of the first radial depth and wherein each second axially extending segment defines a second total circumferential width at least twice as great as an average of the second circumferential widths and a second total radial depth at least twice as great as an average of the second radial depths.

In such an embodiment wherein the second total circumferential width at least twice as great as the average second circumferential width and the second total radial depth at least twice as great as the average second radial depth, the second wire may define a total second wire cross sectional area no greater than the first cross sectional area, for example, the total second wire cross sectional area may advantageously be within the range of 80% to 100% of the first cross sectional area.

In an embodiment wherein the second total circumferential width at least twice as great as the average second circumferential width and the second total radial depth at least twice as great as the average second radial depth, each of the plurality of individual strands may maintain constant relative circumferential and radial positions in each pair of second axially extending segments.

In an embodiment wherein the second total circumferential width at least twice as great as the average second circumferential width and the second total radial depth at least twice as great as the average second radial depth, the second wire may be a twisted wire wherein the plurality of individual strands do not maintain constant relative circumferential and radial positions in each pair of second axially extending segments.

In some embodiments of the electric machine, the electric machine is a three phase electric machine wherein each phase includes at least two windings and the first and second wires of each winding extend for an equal number of wraps.

In some embodiments of the electric machine, each of the plurality of individual strands of the second wire extend for the at least one wrap from a first end to a second end continuously without welds. In such an embodiment, the plurality of individual strands of the second wire may include an outer layer of electrically insulative material whereby the plurality of individual strands form parallel conductors with each of the plurality of individual strands being conductively coupled at the first end to each other and to the first wire and with the plurality of individual strands also being conductively coupled together at the second end.

The invention comprises in another form thereof, an electric machine that includes a rotor operably coupled with a stator wherein the stator includes a stator core defining a plurality of axially extending slots and a plurality of windings and wherein the stator core surrounds the rotor. Each stator winding defines a continuous electrical conductor having a first wire and a second wire connected in series wherein the first wire circumferentially extends about the stator core for at least one wrap and the second wire circumferentially extends about the stator core for at least one wrap. The first wire defines a plurality of first axially extending segments, each of the first axially extending segments being disposed in one of the slots, and a plurality of first end turn segments, each of the first end turn segments connecting a pair of the first axially extending segments disposed in separate slots. The second wire defines a plurality of second axially extending segments, each of the second axially extending segments being disposed in one of the slots, and a plurality second end turn segments, each of the second end turn segments connecting a pair of the second axially extending segments disposed in separate slots. Each of the slots defines a plurality of layers, and wherein, for each individual slot, the slot contains both a first axially extending segment and a second axially extending segment wherein the first axially extending segments are disposed in a first set of the layers and the second axially extending segments are disposed in a second set of the layers and wherein the first set of layers is distinct from the second set of layers. The first wire is a solitary wire defining a first cross sectional area and the second wire comprises a plurality of individual strands with each of the individual strands defining a second cross sectional area less than the first cross sectional area and wherein the second wire defines a total second wire cross sectional area no greater than the first cross sectional area and wherein the individual strands of each second wire are adhered together along a length of the second wire, e.g., along the length between the first and second ends of the second wire. The plurality of slots define a circumferential slot width and the first wire defines a first circumferential width that is greater than 50% of the circumferential slot width and wherein each of the plurality of individual strands of the second wire define a second circumferential width that is less than 50% of the circumferential slot width. The first wire defines a first radial depth and each of the plurality of individual strands of the second wire define a second radial depth that is no greater than 50% of the first radial depth. Each second axially extending segment defines a second total circumferential width at least twice as great as an average of the second circumferential widths and a second total radial depth at least twice as great as an average of the second radial depths. In each individual slot, the second set of layers is disposed radially inwardly of the first set of layers.

In any of the described electric machines, the total second wire cross sectional area may be within the range of 80% to 100% of the first cross sectional area.

In any of the described electric machines, apart from those explicitly having a twisted strand second wire, each of the plurality of individual strands may maintain constant relative circumferential and radial positions in each pair of second axially extending segments.

In any of the described electric machines, apart from those explicitly having a non-twisted strand second wire, the first wire may be a twisted wire wherein the plurality of individual strands do not maintain constant relative circumferential and radial positions in each pair of second axially extending segments.

In any of the described electric machines, the electric machine may be a three phase electric machine wherein each phase includes at least two windings and the first and second wires of each winding extend for an equal number of wraps.

In any of the described electric machines, each of the plurality of individual strands of the second wire may extend for the at least one wrap from a first end to a second end continuously without welds. In such embodiments, the plurality of individual strands of the second wire may also include an outer layer of electrically insulative material whereby the plurality of individual strands form parallel conductors and wherein each of the plurality of individual strands are conductively coupled at the first end to each other and to the first wire and wherein the plurality of individual strands are also conductively coupled together at the second end.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION

Figure 1:
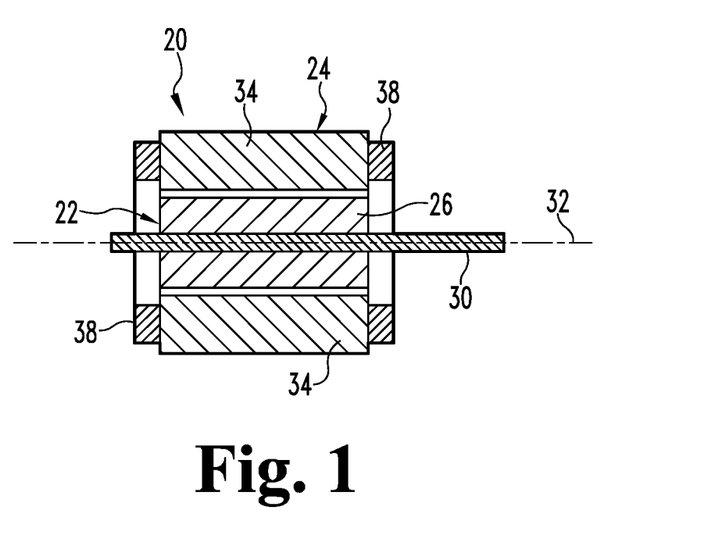
FIG. 1 is a schematic cross sectional view of an electric machine.
Figure 2:
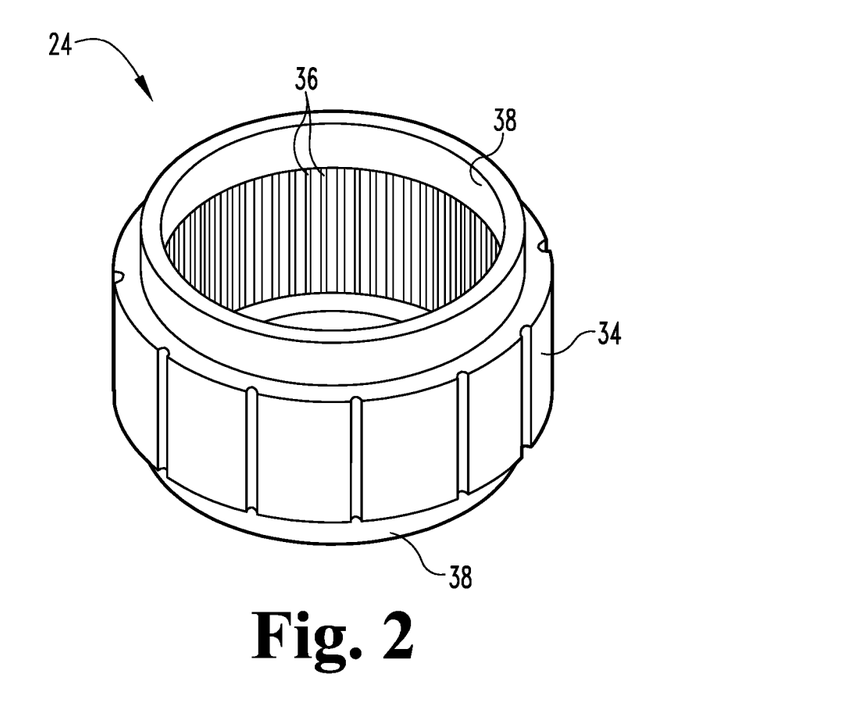
FIG. 2 is a simplified perspective view of a stator.
Figure 3:
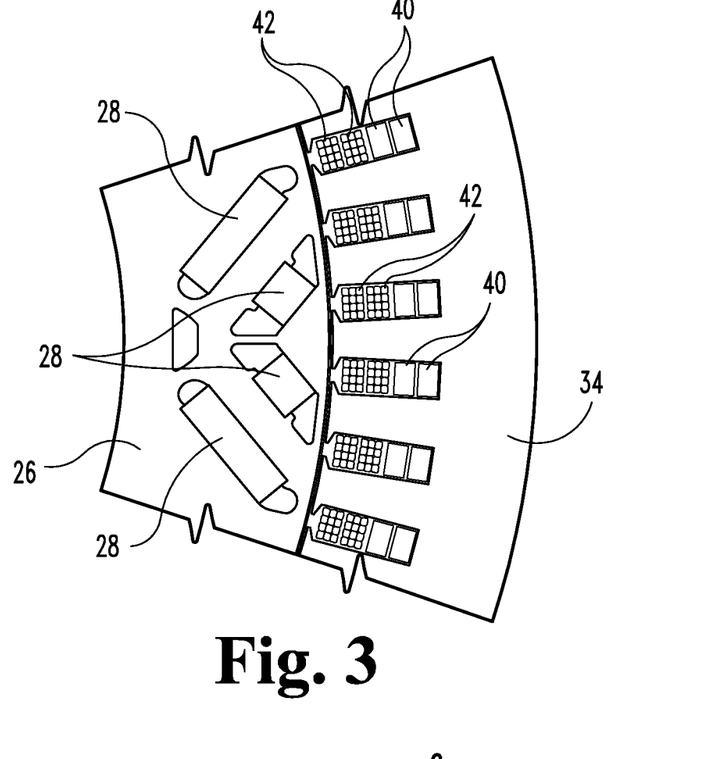
FIG. 3 is a partial cross sectional view of a rotor and stator.

FIG. 1 schematically depicts an electric machine 20 which includes a rotor 22 operably coupled with a stator 24.

Rotor 22 includes a rotor core 26 and a plurality of permanent magnets 28. Rotor core 26 is mounted on rotor shaft 30 and rotates about axis 32. Stator 24 includes a stator core 34 and a plurality of stator windings 38. Stator core 34 defines a plurality of axially extending slots 36 and surrounds rotor 22.

In the illustrated embodiment, electric machine 20 is a three phase electric machine with each phase including two separate conductors or windings 38. Each of the stator windings 38 defines a continuous electrical conductor formed by a first wire 40 and a second wire 42 that are connected in series. In the illustrated embodiment, each of the first and second wires 40, 42 circumferentially extend about the stator core 34 for at least one wrap with the first wire 40 extending for the same number of wraps as the second wire 42.

In this regard, it is noted that the stator windings define a number of stator poles and for a winding to extend circumferentially for a full wrap, it extends such that it has an axially extending segment in each of the stator poles. As a result, a single wrap of a stator winding will extend the full circumference or nearly the full circumference of the stator core, i.e., the full circumference less the circumferential distance between adjacent poles.

First wire 40 defines a plurality of first axially extending segments 44 each of which is disposed in one of the slots 36 and a plurality of first end turn segments 46. Each of the end turn segments 46 which connect a pair of first axially extending segments 44 disposed in separate slots 36. Similarly, second wire 42 defines a plurality of second axially extending segments 48 each of which is disposed in one of the slots 36 and a plurality of second end turn segments 50. Each of the end turn segments 50 connect a pair of second axially extending segments 48 disposed in separate slots 36. An additional end turn will be located near or include the point where the first wire 40 is connected in series to the second wire 42 and may be formed entirely out of either the first wire or second wire or include portions of both the first and second wires.

First wire 40 is formed out of a solid conductor in the form of an individual solitary wire. In the illustrated embodiment wire 40 has a generally rectangular cross section and defines a first cross sectional area 52. Second wire 42 is formed out a plurality of individual strands 54 with each of the individual strands 54 defining a second cross sectional area 56.

In the individual stator slots 36, the second axially extending segments 48 are disposed closer to rotor 22 than the first axially extending segments 42. In the illustrated embodiment, wherein the stator core 34 surrounds rotor 22, this means that the second axially extending segments 48 (stranded wire) are disposed radially inwardly of the first axially extending segments 44 (solitary wire).

The combined use of stranded and solid wires enhances the performance of electric machine 20. Solid wire 40 is an efficient conductor of DC current but when positioned near rotor 22 in slot 36, it experiences relatively greater AC losses than a stranded wire due to the skin effect discussed above. At the more distant positions in slot 36, these skin effects are reduced in what may be referred to as the proximity effect and the greater copper density within the slot obtainable with a solid wire compared to a stranded wire becomes desirable.

The formula presented below can be used to calculate the phase resistance $R_{ph}$ of a winding:

$$R_{ph} = R_{dc}\left[\left(\frac{R_{ac}}{R_{dc}} - 1\right)\left(\frac{\omega_{cal}}{\omega_{ref}}\right)^{\zeta} + 1\right]$$

In this formula, $R_{dc}$ is the DC phase resistance, $R_{ac}$ is the AC phase resistance, $\omega_{cal}$ is the calculated speed, i.e., the speed for which $R_{ph}$ is being calculated, $\omega_{ref}$ is the speed at which $R_{ac}/R_{dc}$ is calculated, and $\zeta$ is a frequency scaling constant. As can be seen from this formula, $R_{ph}$ is reduced, which is desirable, as $R_{ac}/R_{dc}$ approaches 1.

Figure 15:
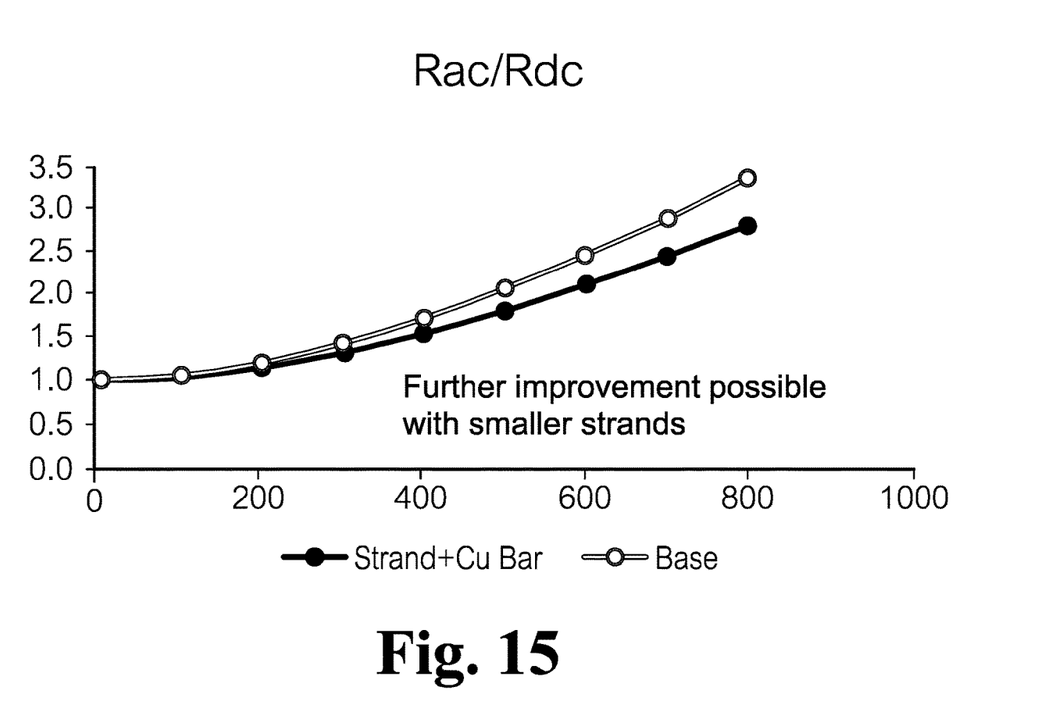
FIG. 15 is a chart comparing the performance of electric machines.

In the chart shown in FIG. 15, the value of $R_{ac}/R_{dc}$ is plotted versus the rotational speed of the electric machine as determined by a computer simulation. The line with filled-in line and dots (strand+Cu Bar) represents the value of $R_{ac}/R_{dc}$ for an electric machine having both stranded and solid stator windings while the line and dots defined by a double line (Base) represents the value of $R_{ac}/R_{dc}$ for an electric machine having a similar design but with all solid stator windings. More specifically, it is a three phase electric machine with an internal permanent magnet rotor wherein the stator includes 10 phase-shifted stator poles per phase, each slot holds four axially extending winding segments, each axially extending segment in their own layer and each pole being formed by eight axially extending winding segments. Each phase includes two windings that extend for four wraps each. In the embodiment having both stranded and solid windings, the windings are half stranded and half solid with each winding having a solid conductor that extends for two wraps connected in series to a stranded conductor that extends for two wraps. While such a design is used to compare the performance of these electric machines, many variations of such a design can beneficially employ the combination of stranded and solid wires disclosed herein.

As can be seen in this chart, at low rotational speeds the value of $R_{ac}/R_{dc}$ for the two electric machines is nearly identical. As the rotational speed increases and the copper losses due to the skin effect become more pronounced, the distinction between the two designs becomes apparent with the performance of electric machine 20 being improved relative to a similar electric machine with all solid stator windings as demonstrated by electric machine 20 having a value for $R_{ac}/R_{dc}$ that is closer to 1.

In the illustrated embodiment, second wire 42 is a continuous stranded wire wherein each of the plurality of individual strands 54 of second wire 42 extend for at least one wrap from a first end 58 of wire 42 to a second end 60 of wire 42 continuously and without welds. Each of the strands 54 are conductively coupled to each other and to the first wire 40 at the first end 58 and are conductively coupled together and an external circuit member at the second end 60. Individual strands 54 include an outer layer of electrically insulative material 62 whereby the plurality of individual strands 54 form separate parallel conductors between the first and second ends 58, 60. Insulative material 62 is advantageously also an adhesive material whereby the individual strands 54 of wire 42 are adhered together between first and second ends 58, 60 and, after being adhered together, the individual strands 54 of a second wire 42 do not move relative to each other. Alternatively, an insulative coating may be applied to the strands 54 and then an adhesive formed out of a different material applied to the coating to adhere the strands together.

Figure 4:
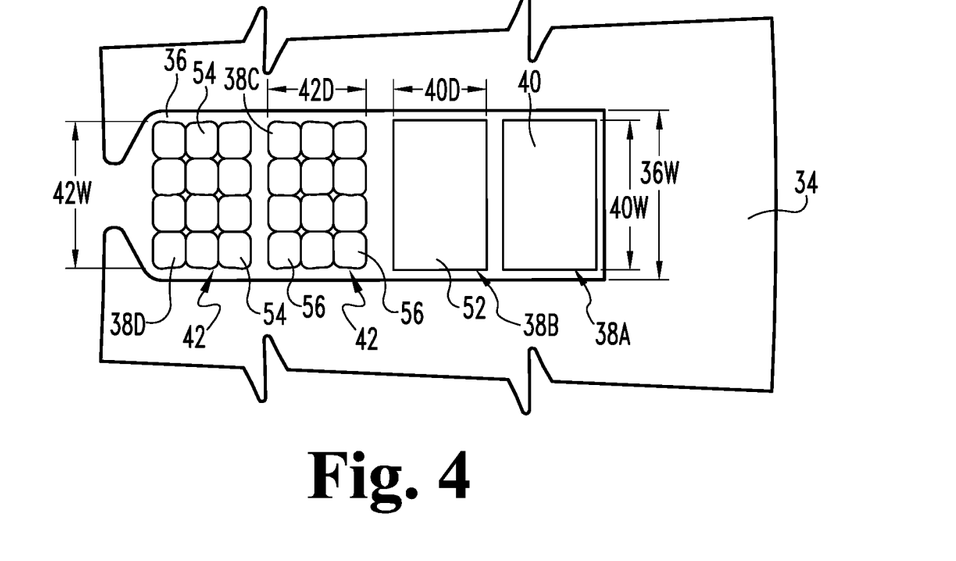
FIG. 4 is an enlarged cross sectional view of a stator slot.

Each of the slots 36 holds several layers 38A, 38B, 38C, 38D of stator windings 38. In the embodiment of FIG. 4, the two radially outermost layers 38A, 38B are occupied by first axially extending segments 44 and the two radially innermost layers 38C, 38D are occupied by second axially extending segments 48. In the illustrated embodiment, each layer holds only a single winding 38. In alternative embodiments, however, the circumferential width of the windings might be sufficiently smaller than the width of the slot such that a plurality of individual windings could be positioned side-by-side in a single layer.

As discussed above, stranded wire 42 is positioned closer to rotor 22 in the slots than solid wire 40. In other words, first axially extending segments 44 are disposed in a first set of layers 38A, 38B and second axially extending segments 48 are disposed in a second set of layers 38C, 38D wherein the first set of layers is closer to rotor 22 than the second set of layers. In the illustrated embodiment, the first set of layers 38A, 38B is distinct from second set of layers 38C, 38D without any individual layer being in both sets.

In an embodiment where more than one wire could be positioned in an individual layer, it would be possible for some of the layers to include both types of wires 40, 42 and the two sets of layers would not be distinct. In such an embodiment, where more than one winding is positioned in an individual layer, such an embodiment could be formed having layers containing only one type of wire at the radially innermost and radially outermost layers and also including a middle transition zone of one or more layers that include both types of wires 40, 42. Alternatively, such an embodiment having multiple windings in each layer could have only a single type of wire 40 or 42 in each of the layers such that the set of layers including first wires 40 was distinct from the set of layers including second wires 42.

The relative circumferential widths of the windings 38 and slots 36 is related to whether or not there is more than one winding 38 in an individual layer. In the illustrated embodiment, first wire 40 defines a first circumferential width 40W that is greater than 50% of the circumferential slot width 36W. Consequently, only one first wire 40 can fit in an individual layer. Generally, when only a single winding 38 is disposed in a layer, its circumferential width will be significantly more than 50% and as close to 100% as allowed for by the manufacturing practicalities of inserting the winding into the slot.

In the illustrated embodiment, second wire 42 includes a plurality of strands 54 each of which defines a second circumferential width 54W that is less than 50% of the circumferential slot width 36W. The plurality of strands 54 forming a second axially extending segment 48 of second wire 42 together define a second total circumferential width 42W that is at least twice as great as an average of the second circumferential widths 54W. In other words, the individual strands 54 forming second axially extending segment 48 are positioned side-by-side within slot 36. Only a single wire 42 is positioned in each layer of the illustrated embodiment, and, thus, it can also be said that second total circumferential width 42W is greater than 50% of the circumferential slot width 36W.

The first and second wires 40, 42 also define a radial depth within slots 36 with first wire 40 defining a first radial depth 40D. Each of the individual strands 54 of second wire 42 define a second radial depth 54D that is no greater than 50% of first radial depth 40D. And, a second total radial depth 42D defined by second axially extending segments 48 of wire 42 is at least twice as great as an average of the second radial depths 54D. In other words, when wire 42 is inserted into slots 36 at least two strands 54 are positioned front-to-back in each axially extending segment 48.

Generally, it will be desirable for second wire 42 to have a total dimensions that are substantially equivalent to the dimensions of first wire 40 so that they fit within approximately the same "footprint" within slot 36. In other words, the second total circumferential width 42W is equivalent to the first circumferential width 40W and the second total radial depth 42D is equivalent to the first radial depth 40D. When wires 40, 42 have such substantially equivalent dimensions, second wire 42 will define a total cross sectional area, i.e., a summation of all the cross sectional areas 56 of the individual strands 54, that is no greater than the first cross sectional area 52 because there will necessarily be some cross sectional area lost to the insulative coating 62 and unfilled voids between the strands 54. If second wire has a slightly larger footprint than first wire, it can have a total cross sectional area equal to or even slightly greater than first wire, however, such a larger footprint would present manufacturing and slot design complexities. Advantageously, second wire 42 defines a total cross sectional area, i.e., summation of areas 56, in a range from 80% to 100% of first cross sectional area 52. The illustrated embodiment uses a stranded wire 42 having a footprint substantially equivalent to first wire 40 and a total cross sectional area of approximately 82% of the first wire.

While it will often be desirable to form both first wire 40 and second wire 42 out of the same material, they can be formed out of different materials and, in some applications, this may provide advantages. For example, due to second wire 42 having a smaller cross sectional area than first wire 40, in some applications it may be desirable to use a more conductive material to form second wire 42.

Figure 9:
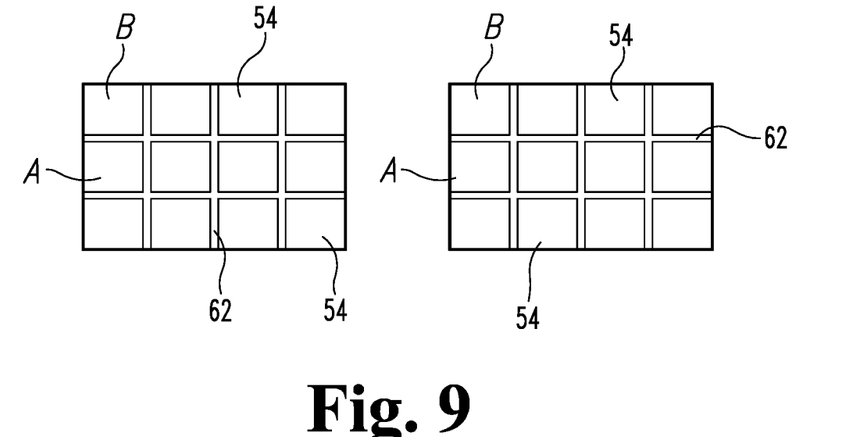
FIG. 9 is a schematic cross sectional view of a pair of axially extending segments of a non-twisted stranded wire.

Stranded second wire 42 can be either a twisted or non-twisted stranded wire. In a non-twisted stranded wire which has die-formed end loops, each of the plurality of individual strands 54 maintains the same relative circumferential and radial positions in each pair of second axially extending segments. This can be seen in FIG. 9 which schematically depicts a cross sectional view of a pair of second axially extending segments 48 that are connected by a second end turn 50. In this schematic depiction, it can be seen that strands A and B are in the same relative circumferential and radial positions in both slots. In this regard, it is noted that the slot and the other axially extending segments within the slot are not shown in FIG. 9. Instead, the pair of axially extending segments 48 are shown in isolation. In FIG. 9, each of these segments are oriented such that the top of the page represents the radially outmost direction within the slot.

Figure 10:
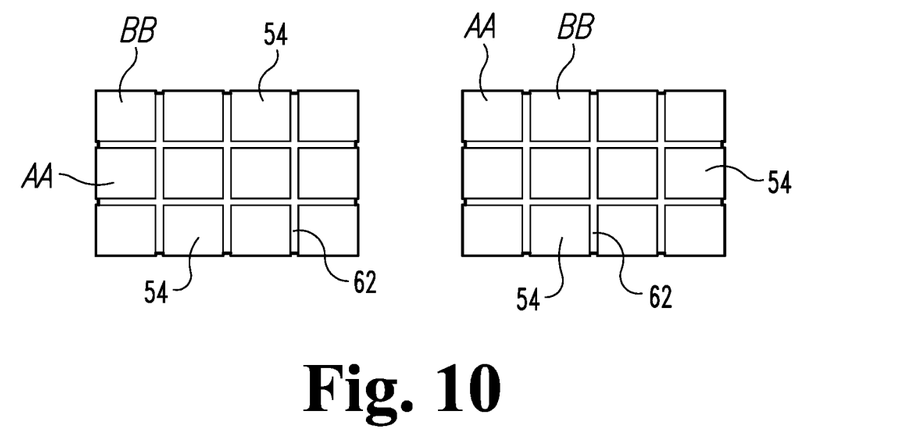
FIG. 10 is a schematic cross sectional view of a pair of axially extending segments of a twisted stranded wire.

FIG. 10 schematically depicts a cross sectional view of a pair of second axially extending segments 48 that are connected by a second end turn 50. In this schematic depiction, the individual strands do not maintain the same relative circumferential and radial positions in both slots. As can be seen strand AA changes its relative radial position and strand BB changes its relative circumferential position. Such a change in relative positions can result from the use of a twisted strand wire. In this regard, it is noted that the slot and the other axially extending segments within the slot are not shown in FIG. 10. Instead, the pair of axially extending segments 48 are shown in isolation. In FIG. 10, each of these segments are oriented such that the top of the page represents the radially outmost direction within the slot.

It is noted that while the relative positions of the individual strands may change from slot-to-slot, these strands are advantageously still adhered together and do not move relative to each other. In other words, a twisted wire can be formed out of individual strands that are adhered together and fixed in their positions relative to each other. In this regard, it is noted that such stranded wires will often have a limit to which they can be bent before the adhesion between the strands 54 breaks and the individual strands 54 separate and become moveable relative to each other. Second end turns 50 are advantageously designed such that the bends formed in wire 42 will not break the adhesion between the individual strands 54.

Non-twisted stranded wire will generally be less expensive and more easily obtained than twisted stranded wire. However, twisted wire can have other advantages. Often, it will have superior strength with regard to resisting the breaking of adhesion between the individual strands 54 compared to a non-twisted wire and will also provide a more electrically balanced conductor due to the changing relative slot positions of the individual strands.

When forming stator windings, two of the more common methods of forming the end loops in the wire are die-forming and P-forming. When die-forming the end loops, each individual face of the wire retains the same orientation from one slot to the next. In other words, the wire face that is directed radially inwardly, remains facing radially inwardly in all of the slots. When the end loops are P-formed, the wire forming the stator winding is rotated about its central axis by 90 degrees over the course of each end loop. As a result, a wire face that is directed radially inwardly in one slot will be directed circumferentially in the next slot.

A stranded second wire 42 will have individual strands 54 that change relative positions if the wire is originally manufactured as a twisted strand wire or if it is originally manufactured as a non-twisted strand wire and then P-formed for insertion in the stator. For purposes of this Application, both such variants are considered twisted because they result in the changed relative positions of the individual strands.

Figure 5:
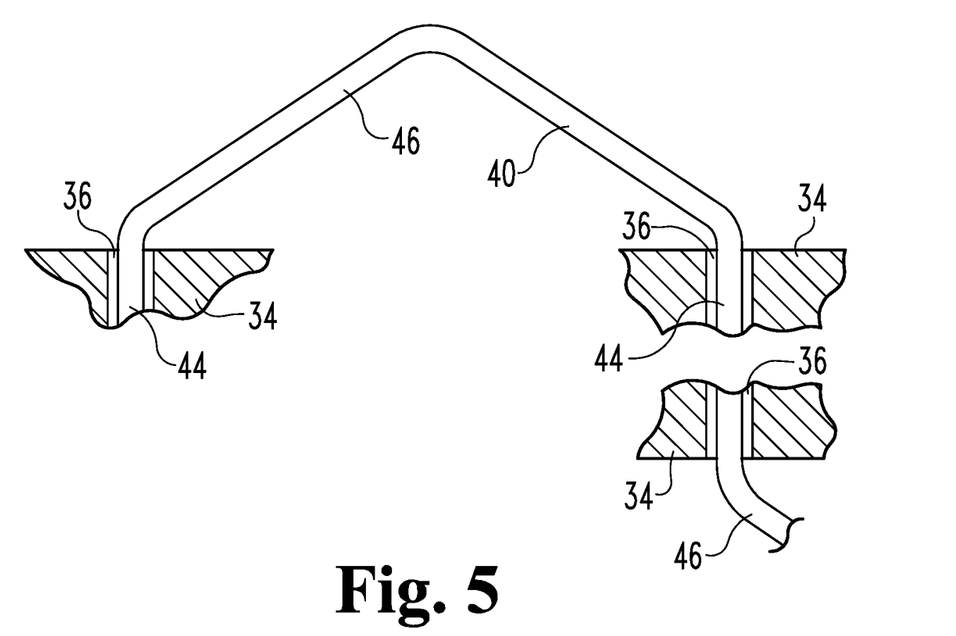
FIG. 5 is a cut-away schematic view of a solid wire forming a portion of a stator winding.
Figure 6:
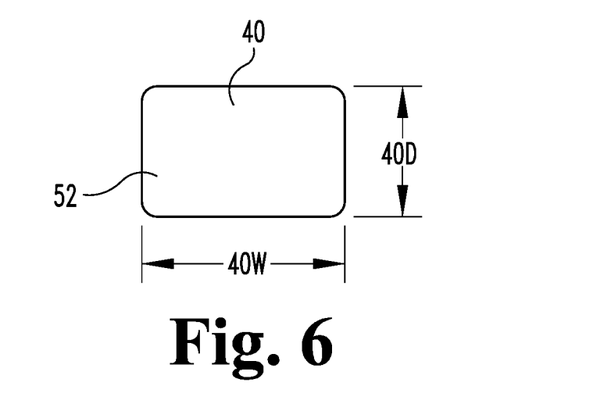
FIG. 6 is a cross sectional view of a solid wire.
Figure 7:
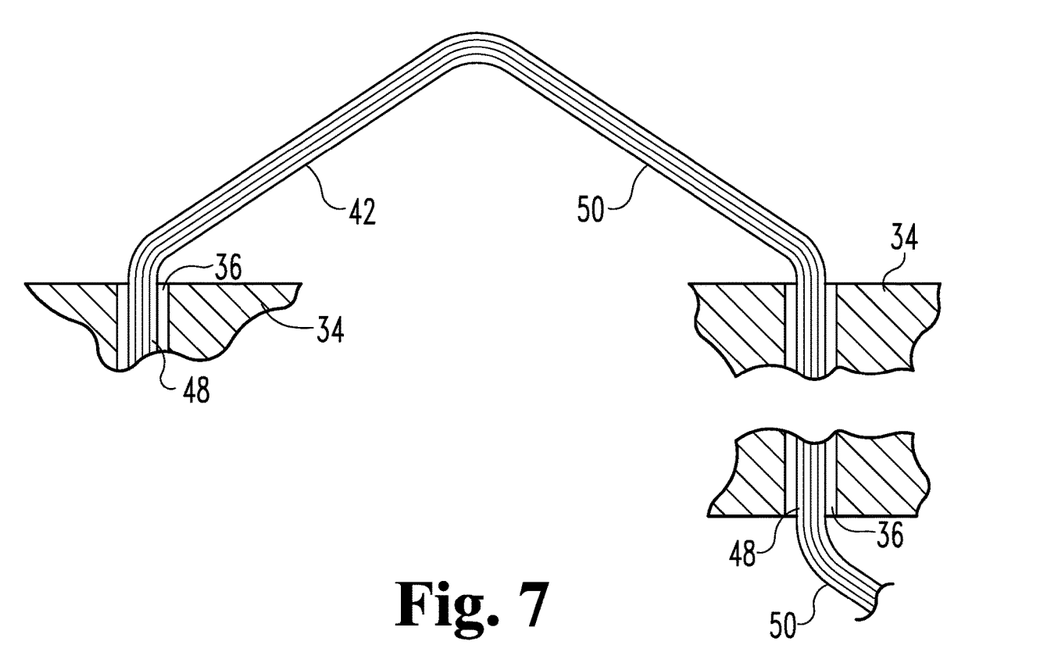
FIG. 7 is a cut-away schematic view of a stranded wire forming a portion of a stator winding.
Figure 8:
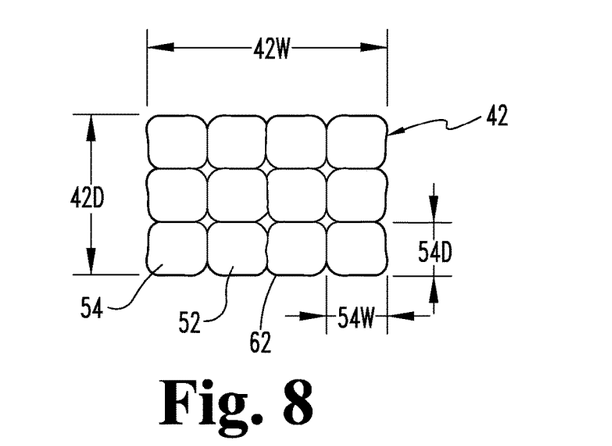
FIG. 8 is a cross sectional view of a stranded wire.

FIG. 5 depicts a length of first wire 40 including a first end turn 46 and a pair of first axially extending segments 44 connected by the first end turn 46. FIG. 6 represents a cross sectional view of a first axially extending segment 44. Similarly, FIG. 7 depicts a length of second wire 42 including a second end turn 50 and a pair of second axially extending segments 48 connected by the second end turn 50. FIG. 8 depicts a cross sectional view of a second axially extending segment 48. The individual strands 54 of second wire 42 may be formed out of strands that are originally circular in cross section, the strands may then be coated with insulative and adhesive material and compressed into the desired final cross sectional shape of the second wire 42. This will often result in a change in the shape of the individual strands. An outer layer of material, such as a sheath or additional coating may also be applied to the second wire after forming the individual strands into a single wire.

Figure 11:
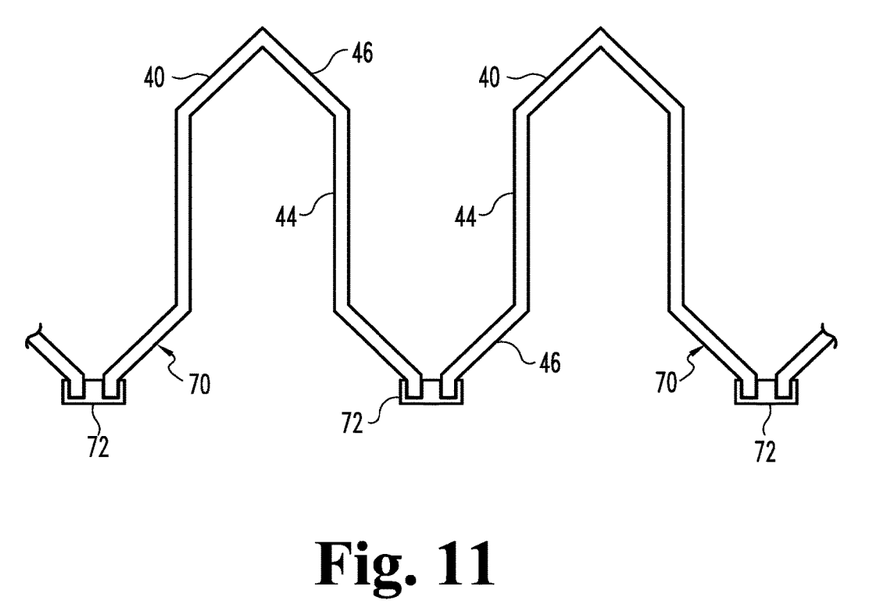
FIG. 11 is a schematic view of a portion of a solid wire hairpin winding.

First wire 40 may extend for one or more wraps as a single continuous wire or be formed by a series of hairpin conductors which are connected in series to form first wire 40. FIG. 11 schematically depicts hairpin conductors 70 used to form a first wire 40. Each of the hairpin conductors forms an end turn 46 connected to a pair of axially extending segments 44 and a half of an end turn 46 at each distal end of the hairpin 70. By inserting all of the hairpin conductors 70 through the stator slots from the same end, the distal end of circumferentially adjacent hairpin conductors 70 can be welded together to thereby form a first wire 40. In FIG. 11, welds 72 are depicted. Alternatively, a single continuous length of solid wire that does not require any welds can be formed into the necessary shape and inserted into the stator core to form first wire 40.

Figure 12:
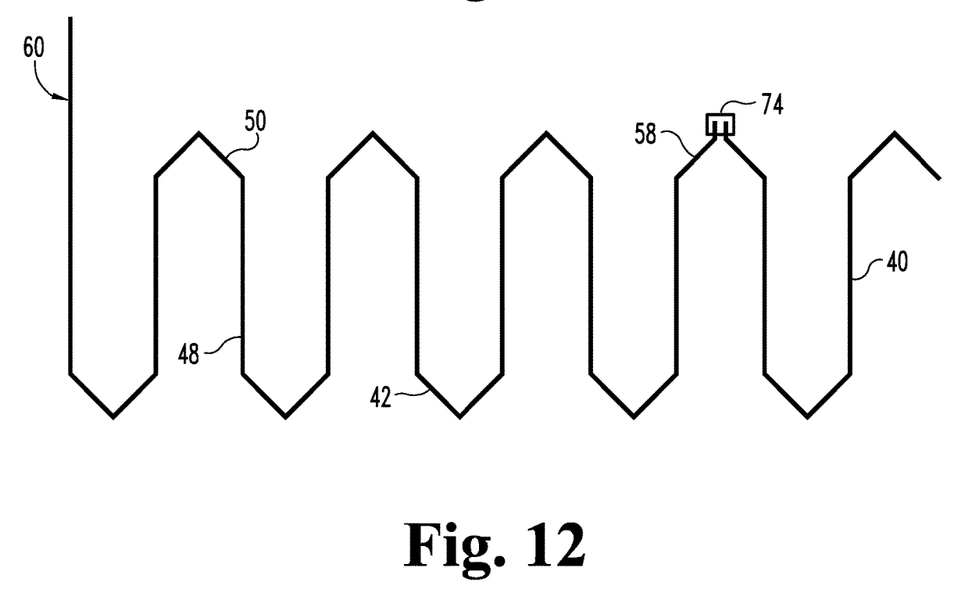
FIG. 12 is a schematic view of a stranded wire forming a portion of a stator winding.

FIG. 12 schematically depicts how second wire 42 can be formed out of a single continuous length of stranded wire from first end 58 to second end 60. Weld 74 connects first end 58 to first wire 40. The individual strands of the second wire 42 of FIG. 12 are adhered together along the full length of the second wire from the first end 58 to the second end 60.

Figure 13:
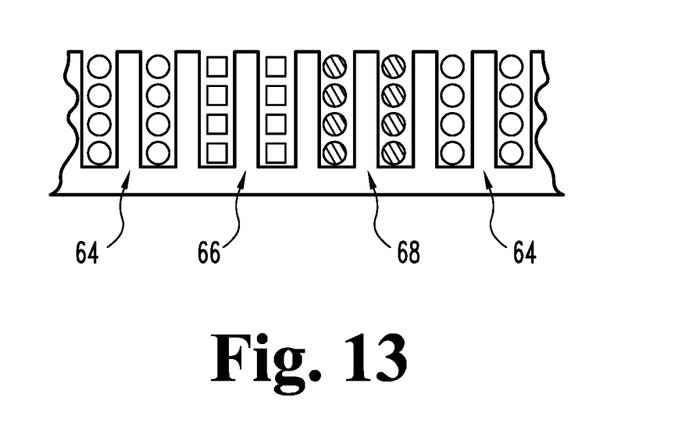
FIG. 13 is a schematic view of adjacent stator poles.
Figure 14:
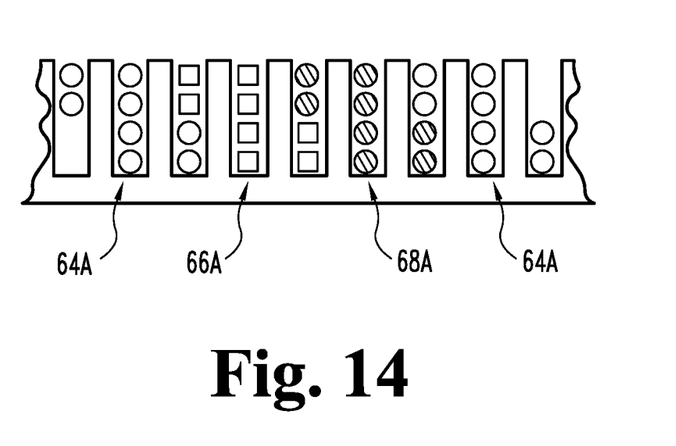
FIG. 14 is a schematic view of adjacent phase-shifted stator poles.

As mentioned above, stator windings 38 form individual poles. FIGS. 13 and 14 schematically depict two different types of stator poles. FIG. 13 schematically depicts a three-phase electric machine with non-phase shifted poles. In this example, the windings depicted by circles are one of the three phases, the windings depicted by squares are a second one of the three phases and the circles with cross hatching are a third one of the three phases. These different cross sections are done for graphical clarity and do not represent the actual physical structure of the windings. Shown in FIG. 13 are two poles 64 formed by windings in the first phase, positioned between these two poles are a pole 66 from the second phase and a pole 68 from the third phase. As can be seen, each slot contains windings from only one of the three phases. The illustrated pattern will be repeated about the entire circumference of the stator core with each phase having the same total number of poles.

FIG. 14 schematically depicts a three-phase electric machine with phase-shifted poles. Similar to FIG. 13, circles, squares and cross hatched circles represent windings from the three different phases and form stator poles 64A, 66A, 68A. As can be seen in FIG. 14, some of the slots contain windings from two different phases. The use of such phase-shifted poles can provide a more electrically balanced stator. The illustrated pattern will be repeated about the entire circumference of the stator core with each phase having the same total number of poles.

While this invention has been described as having an exemplary design, the present invention may be further modified within the spirit and scope of this disclosure. This application is therefore intended to cover any variations, uses, or adaptations of the invention using its general principles.

What is claimed is:

1. An electric machine comprising:
   a rotor operably coupled with a stator wherein the stator includes a stator core defining a plurality of axially extending slots and a plurality of windings and wherein the stator core surrounds the rotor;
   wherein each stator winding defines a continuous electrical conductor having a first wire and a second wire connected in series, the first wire circumferentially extending about the stator core for at least two wraps and the second wire circumferentially extending about the stator core for at least two wraps and wherein the first and second wires of each winding extend for an equal number of wraps;
   wherein the first wire defines a plurality of first axially extending segments, each of the first axially extending segments being disposed in one of the slots, and a plurality of first end turn segments, each first end turn segment connecting a pair of the first axially extending segments disposed in separate slots;
   wherein the second wire defines a plurality of second axially extending segments, each of the second axially extending segments being disposed in one of the slots, and a plurality second end turn segments, each second end turn segment connecting a pair of the second axially extending segments disposed in separate slots;

wherein each of the slots defines a plurality of layers, and wherein, for each individual slot, the slot contains at least two first axially extending segments and at least two second axially extending segments wherein there are an equal number of first and second axially extending segments in each slot and wherein the first axially extending segments are disposed in a first set of the layers and the second axially extending segments are disposed in a second set of the layers wherein the first set of layers is distinct from the second set of layers;

wherein the first wire is a solitary wire defining a first cross sectional area and the second wire is a multi-strand wire comprising a plurality of individual strands, each of the individual strands defining a second cross sectional area less than the first cross sectional area and wherein the second wire defines a total second wire cross sectional area no greater than the first cross sectional area and wherein the individual strands of each second wire are adhered together along a length of the second wire;

wherein the plurality of slots define a circumferential slot width and the first wire defines a first circumferential width that is greater than 50% of the circumferential slot width and wherein each of the plurality of individual strands of the second wire define a second circumferential width that is less than 50% of the circumferential slot width;

wherein the first wire defines a first radial depth and each of the plurality of individual strands of the second wire define a second radial depth that is no greater than 50% of the first radial depth and wherein each second axially extending segment defines a second total circumferential width at least twice as great as an average of the second circumferential widths and a second total radial depth at least twice as great as an average of the second radial depths;

wherein, in each individual slot, the second set of layers is disposed radially inwardly of the first set of layers;

wherein, for each individual slot, the number of solitary wire axially extending segments disposed in the slot is equal to the number of multi-strand wire axially extending segments disposed in the slot;

wherein the second wire is a twisted wire and the plurality of individual strands do not maintain constant relative circumferential and radial positions in each pair of second axially extending segments and wherein the second wire is originally manufactured as a non-twisted wire and the second wire is twisted in each of the second end turn segments; and wherein the electric machine is a three phase electric machine and each phase includes two windings and the first and second wires of each winding extend for two wraps and each of the slots defines four layers with each layer having one axially extending winding segment disposed therein and wherein each phase defines a plurality of circumferentially distributed poles, each of the poles being formed by four first axially extending segments and four second axially extending segments.

2. The electric machine of claim 1 wherein, in each individual slot, the second axially extending segments are disposed radially inwardly of the first axially extending segments.

3. The electric machine of claim 1 wherein the total second wire cross sectional area is 82% of the first cross sectional area.

4. The electric machine of claim 1 wherein each of the plurality of individual strands of the second wire extend for the at least one wrap from a first end to a second end continuously without welds.

5. The electric machine of claim 4 wherein the plurality of individual strands of the second wire include an outer layer of electrically insulative material whereby the plurality of individual strands form parallel conductors and wherein each of the plurality of individual strands are conductively coupled at the first end to each other and to the first wire and wherein the plurality of individual strands are conductively coupled together at the second end.

* * * * *